US007710516B1

(12) United States Patent
Jeffway, Jr. et al.

(10) Patent No.: US 7,710,516 B1
(45) Date of Patent: May 4, 2010

(54) LIQUID CRYSTAL DISPLAY WITH COLOR SECTOR BACKLIGHTING

(76) Inventors: Robert W. Jeffway, Jr., 37 Front St., Leeds, MA (US) 01063; Robert F. Schwartzman, 250 Mercer St., New York, NY (US) 10012; Peter David Williams, 5780 Lokelani Rd., Kapaa, HI (US) 96746

( * ) Notice: Subject to any disclaimer, the term of this patent is extended or adjusted under 35 U.S.C. 154(b) by 147 days.

(21) Appl. No.: 11/709,030

(22) Filed: Feb. 22, 2007

(51) Int. Cl.
*G02F 1/1335* (2006.01)
*G09G 3/36* (2006.01)
*A45B 3/02* (2006.01)
*A63B 15/02* (2006.01)

(52) U.S. Cl. ..................... 349/69; 362/97.2; 345/102
(58) Field of Classification Search ............ 349/69; 362/97.2; 345/102
See application file for complete search history.

(56) References Cited

U.S. PATENT DOCUMENTS 5,976,017 A * 11/1999 Omori et al. ............... 463/32
7,172,325 B2   2/2007 Kim et al.
2003/0193629 A1 * 10/2003 Yamaguchi ............... 349/61
2005/0041173 A1 *  2/2005 Kubota et al. ............. 349/61
2007/0153515 A1 *  7/2007 Hong et al. ............... 362/237

* cited by examiner

*Primary Examiner*—Frank G Font
*Assistant Examiner*—Jerry Blevins
(74) *Attorney, Agent, or Firm*—Andrew Bodendorf

(57) ABSTRACT

An LCD display system provides colored backlighting to enhance the viewing experience of presentations by the display system. The liquid crystal display (LCD) system includes a monochrome LCD to display monochrome information including at least two sectors; at least two backlighting elements to emit light in a plurality of colors, each backlighting element associated with one sector of the LCD and configured to backlight the one associated sector with a color light; and a processing device to control display of the information on the LCD and to select the color emitted by each backlighting from the plurality of colors. Each backlighting element may include two or more different color light emitting diodes (LEDs) wherein the intensity of each color LED is controlled by the processing device to provide the color selected by the processing device. A reflective element may be positioned relative to the backlighting element to reflect the color light emitted by the backlighting element. A diffusing element may be positioned between the backlighting element and the LCD.

24 Claims, 3 Drawing Sheets

LIQUID CRYSTAL DISPLAY WITH COLOR SECTOR BACKLIGHTING

TECHNICAL FIELD

The following description relates generally to LCDs and in particular to toys and portable devices with LCDs.

BACKGROUND

A liquid crystal display (LCD) is a thin, flat display device made up of any number of monochrome pixels arrayed in front of a light source or reflector. Each pixel of an LCD consists of a layer of perpendicular molecules aligned between two transparent electrodes, and two polarizing filters, the axes of polarity of which are perpendicular to each other. Typically, the surfaces of the electrodes in contact with the liquid crystal material are treated to align the liquid crystal molecules in a particular direction.

Before applying an electric field, the orientation of the liquid crystal molecules is determined by the alignment at the surfaces. In a twisted nematic device (the most common liquid crystal device), the surface alignment directions at the two electrodes are perpendicular. The molecules arrange themselves in a helical structure or twist. Because the liquid crystal material is birefringent, light passing through one polarizing filter is rotated by the liquid crystal helix as it passes through the liquid crystal layer, allowing it to pass through the second polarized filter. Half of the light is absorbed by the first polarizing filter, but otherwise the entire assembly is transparent.

When a voltage is applied across the electrodes, a torque acts to align the liquid crystal molecules parallel to the electric field, distorting the helical structure reducing the rotation of the polarization of the incident light, and the device appears gray. If the applied voltage is large enough, the liquid crystal molecules are completely untwisted and the polarization of the incident light is not rotated at all as it passes through the liquid crystal layer. This light will then be polarized perpendicular to the second filter, and thus be completely blocked and the pixel will appear black. By controlling the voltage applied across the liquid crystal layer in each pixel, light can be allowed to pass through in varying amounts, correspondingly illuminating the pixel.

LCDs like those found in calculators have direct driven image elements where a voltage can be applied across one segment without interfering with other segments of the display. These LCDs are relatively cheap to manufacture and therefore are used in low cost items such as digital clocks, watches, calculators, and toys. While cheap these LCDs are considered by some to be less than aesthetically pleasing; whereas, color LCDs are cost prohibitive for use in such devices.

SUMMARY

In one general aspect, a liquid crystal display (LCD) system includes: a monochrome LCD to display monochrome information including at least two sectors; at least two backlighting elements to emit light in a plurality of colors, each backlighting element associated with one sector of the LCD and configured to backlight the one associated sector with a color light; and a processing device to control display of the information on the LCD and to select the color emitted by each backlighting from the plurality of colors. Each backlighting element may include two or more different color light emitting diodes (LEDs) wherein the intensity of each color LED is controlled by the processing device to provide the color selected by the processing device. A reflective element may be positioned relative to the backlighting element to reflect the color light emitted by the backlighting element to the LCD to backlight the one associated sector. A diffusing element may be positioned between the backlighting element and the LCD to allow the color light passing through the diffusing element to be randomly scattered and backlight the one associated sector.

In one example, the color selected by the processing device for each backlighting element may be different. In another example, the color selected by the processing device changes with the information displayed. In addition, the color selected by the processing device may be based on the information displayed.

In yet another general aspect a liquid crystal display (LCD) system includes: a first monochrome LCD to display monochrome information; a second monochrome LCD to display monochrome information; at least two backlighting elements to emit light in a plurality of colors, each backlighting element associated with one of the monochrome LCDs and configured to backlight the one associated one of the monochrome LCDs with a color light; and a processing device to control display of the information on each monochrome LCD and to select the color emitted by each backlighting from the plurality of colors. In yet another general aspect, a portable device includes: a monochrome LCD to display monochrome information including at least two sectors; at least two backlighting elements to emit light in a plurality of colors, each backlighting element associated with one sector of the LCD and configured to backlight the one associated sector with a color light; a processing device to control display of the information on the LCD and to select the color emitted by each backlighting from the plurality of colors; and a housing to secure the monochrome LCD in fixed relation to the backlighting elements. A user interface may be provided to control and interact with the processing device, and the information displayed may be associated with a game or a toy.

Other features will be apparent from the description, the drawings, and the claims.

DESCRIPTION OF DRAWINGS

Like reference symbols in the various drawings indicate like elements.

DETAILED DESCRIPTION

As described herein, an LCD system provides colored backlighting to enhance the viewing experience of presentations by the display system. The LCD system includes a monochrome LCD to display monochrome information backlighting elements to emit light in a plurality of colors all under control of a processing device. The LCD is relatively cheap to manufacture while providing color allowing it to be used in portable, handheld, game, and toy device. The display system and its operation are described in greater detail below.

Figure 1:
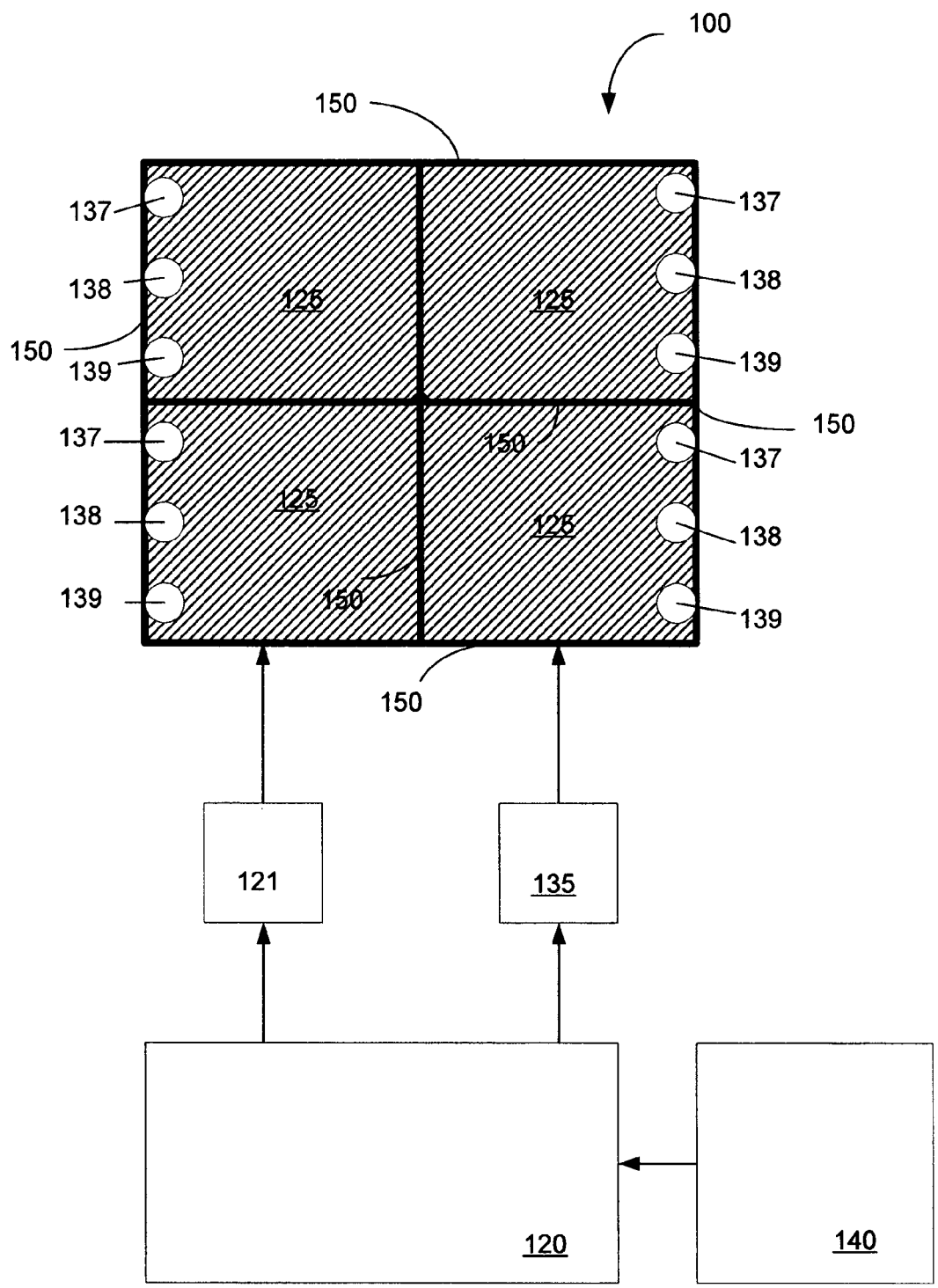
FIG. 1 is an exemplary block diagram of an LCD system.
Figure 2:
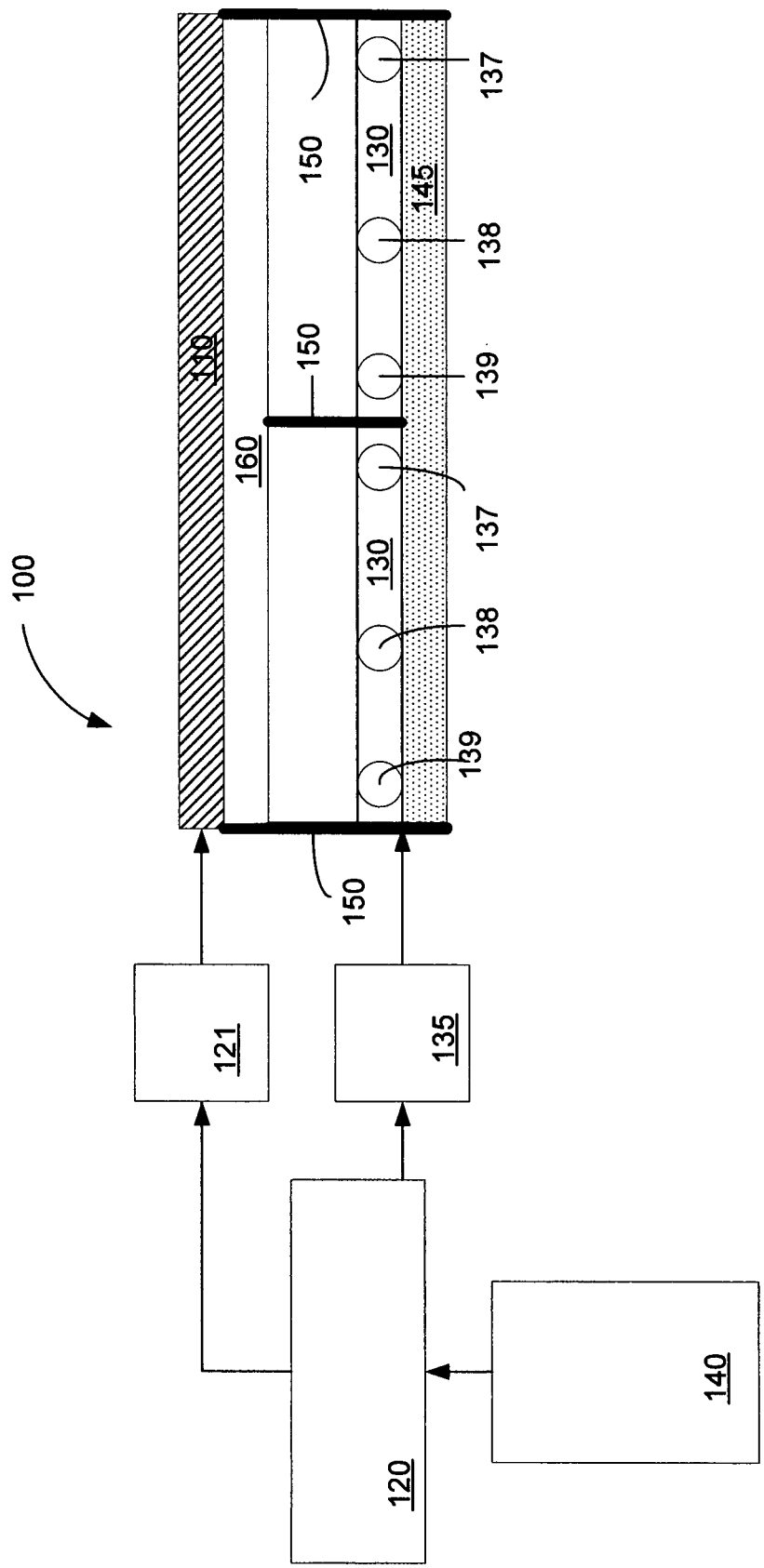
FIG. 2 is a side plane view of an exemplary LCD system of FIG. 1.

As shown in FIGS. 1 and 2, an LCD display system 100 may be used in a personal or portable device, such as, for example, a toy or a game device. The display system 100 includes an LCD 110. The LCD 110 may be implemented using any type of LCD technology. Typically, an LCD may be implemented as a thin, flat display device made up of any number of monochrome pixels arrayed in front of a light source or reflector. For example, twisted nematic (TN) field effect LCDs that include a small number of segments, such as those used in digital watches and pocket calculators, have a single electrical contact for each segment to which an external dedicated circuit supplies an electric charge to control each segment. In addition, a passive-matrix structure, supporting row and column addressing for each pixel, employing supertwist nematic (STN) or double-layer STN (DSTN) technology may be used to provide monochrome displays, such as those found in personal organizers and laptop screens. The LCD 110 is controlled by a processing device 120 and any associated circuitry 121 to display visual information to a user including any number of shapes, images, animations, and/or characters in monochrome black and white and/or some type of grayscale.

According to one implementation, the LCD 110 includes two or more display sectors 125 where each sector is a contiguous portion or area of the display. The LCD 110 may be divided into sectors 125 of equal or disproportionate areas. In another example, each sector 125 may implemented as a separate or discrete LCD, which collectively are referred to as LCD 110. In yet another example, a portion or areas of the display may not be associated with or include a sector 125 (i.e., a portion or areas of the LCD 110 may not be backlit or not backlit in color). Each display sector 125 is associated with at least one backlighting element 130. Each backlighting element 130 is provided adjacent to or spaced apart from a corresponding sector 125 of the LCD 110. The backlighting elements 130 include two or more color lighting sources controlled by the processing device 120 and any driving/control circuitry 135 associated with the lighting elements 130. The processing device 120 controls each backlighting element 130 and associated circuitry 135 to generate or emit light of a desired color to backlight the LCD. The backlighting elements 130 may be selected (e.g., through direct connection to an output of the processing device) or addressed (e.g., using row and column address similar that that provided for a memory device) to control the individual color generated or emitted by the element 130.

The backlighting element 130 may include two or more color light emitting diodes (LEDs). In one example, the backlighting element 130 may include three LEDs 137, 138, and 139, each of a different color, for example, red, green, and blue. The intensity of each color LED is controlled by the processing device 120 such that the color of light emitted by each LED is mixed to produce one overall perceived color of backlight for one sector 125 of the LCD 110 corresponding to a predetermined or desired color of backlight for the sector 125. For example, the intensity of each LED of the backlighting element 130 may be controlled via the processing device 120 using a modulation technique, such as, for example, pulse width modulation, to rapidly turn on and off each LED over a duty cycle (faster than is perceived by the human eye). Of course one skilled in the art will appreciate that other modulation and techniques may be used to control the intensity emitted by each LED. In addition, intensities of the LEDs may be controlled by the processor in other manners. For example, multiple outputs of the processing device 120 are used to vary the current provided to and thus the intensity of each LED electrically connected to the outputs to provide different colored light. In addition, digital to analog converters and/or a resistance network (e.g., a resistance ladder) connect to each LED may be used to vary the intensities of the LEDs and therefore the overall color emitted.

Combinations of intensities of each color LED produce a single perceived color emitting form the backlighting device 130. Light intensity values for each LED that correspond to a desired color may be stored in a memory device 140 that is accessed by the processing device 120. Other light sources also may be used, such as, for example, incandescent lights or fiber optic lights. The overall desired color emitted from the backlighting element 130 may be continuous, semi-continuous, in a sequence, pattern, or strobe of one or more desired colors.

In one example, a reflective element 145 may be provided for each lighting element 130 or one or more reflective elements 145 may be shared by the backlighting elements 130. The reflective element 145 may be implemented using any material that reflects visible light. The reflective element 145 is positioned relative to the backlighting element 130 to reflect light emitted by the backlighting element 130 to the LCD 110 to backlight the corresponding sector 125 of the LCD 110.

In addition, walls or barriers 150 may be provided corresponding to the sectors 117 of the LCD 110. The barriers act to separate each backlighting element 130 such that light emitted by the backlighting element 130 (and reflected) only backlight the sector 125 of the LCD 110 associated with the backlighting element 130, and to prevent light emitted by the backlighting element 130 (and reflected) from lighting or bleeding into any other sectors 125. In one example, the barriers 150 may have a surface that either reflects visible light emitted by the backlighting element 130 or may diffuse light emitted by the backlighting element 130.

An optional diffusing element 160 may be provided between the backlighting element 130 and the LCD 110. The light diffusing element 160 is implemented using any material with a high optical depth and very short mean free path allowing light passing through the diffusing element to be randomly scattered. The diffused light after passing through element 160 backlights the corresponding sector 125 of the LCD 110 with a desired color controlled by the processing device 120.

The processing device 120 may be implemented using a general-purpose or a special purpose computer, such as, for example, a digital signal processor (DSP), a processor, a microcomputer, or a microprocessor capable of responding to and executing instructions in a defined manner. The processing device 120 may run one or more software applications to command and direct the processing device 120. The software applications may include a computer program, a piece of code, an instruction, or some combination thereof, for independently or collectively instructing the processing device 120 to operate as desired. The processing device 120 also may access, store, and/or create data in response to the applications.

The applications and data may be embodied permanently or temporarily in any type of machine, component, physical or virtual equipment, storage medium, or propagated signal wave capable of providing instructions to or being interpreted by the processing device 120. In particular, the applications or data may be stored by a storage medium or memory 140 including volatile and non-volatile memories (e.g., a read only memory (ROM), a random access memory (RAM), a flash memory, a floppy disk, a hard disk, a compact disk, a tape, a DROM, a flip-flop, a register, an SRAM, DRAM, PROM, EPROM, OPTROM, EEPROM, NOVRAM, or RAMBUS), such that if the memory 140 is read by the processing device 120, the specified steps, processes, and/or instructions are performed. The memory 140 may include an interface, such that data and applications may be loaded and stored in the memory 140 allowing the applications, programming, and color data to be updated, changed, or augmented. The memory 140 also may be removable, such as, for example, a card, a stick, or a disk that is inserted in or removed from a device. As a result, the memory 140 may accommodate different color sets, data, and/or programs to allow the processing device 120 to be adapted to different modes, games, situations and/or scenarios, as explained in further detail below.

Each backlighting element 130 may be addressed or selected such that the processing device 120 may select the backlighting device 130 corresponding to a desired or predetermined sector 125 of the LCD 110. In particular, an application of the processing device 120 may be used to address or select a backlighting element 130 and its associated LEDs (e.g., 137, 138, and 139,) to control the intensities of the LEDs to emit light such that when the light is emitted and/or mixed, a single, predetermined, desired color of light backlights a particular sector 125 of the LCD 110. According to the application, the processing device 120 may access data (e.g., color intensity values) in the memory 140 (e.g., a lookup table) for each of the LEDs of a backlighting element 130 corresponding to a desired color of backlighting for a sector 125. Using a modulation technique, such as, for example, pulse width modulation, the processing device 120 may control the intensity of each LED such that the each LED is turned on for a portion or percentage of a duty cycle. By using different intensities for each LED, the combined emitted light from each LED presents a different overall color based on the desired color of backlighting.

The processing device 120 also controls the presentation of images, shapes, and/or characters displayed by a particular sector 125 of the LCD 110. The processing device may be programmed to select a backlighting element 130 associated with a sector 125 to backlight the sector with a color desired to correspond to the image, shape, or characters displayed. For example, if the sector 125 displays a sunset, the processing device 120 may control the corresponding backlighting element 130 to emit an orange light to cause the sector 125 of the LCD 110 to appear orange. In another example, the processing device 120 may cause a sector 125 of the LCD 110 to display the shape of a lemon or the characters "Lemon." The processing device 120 also may control the backlighting element 130 associated with the sector 125 to emit a lemon yellow light to cause the sector 125 of the LCD 110 to appear lemon yellow. In addition, a series of two or more colors and other effects such as strobing or blinking may be used in conjunction with the information displayed (such as flashing yellow red and orange for an explosion displayed on the LCD 110) for effects commonly associated with games or animations.

Figure 3:
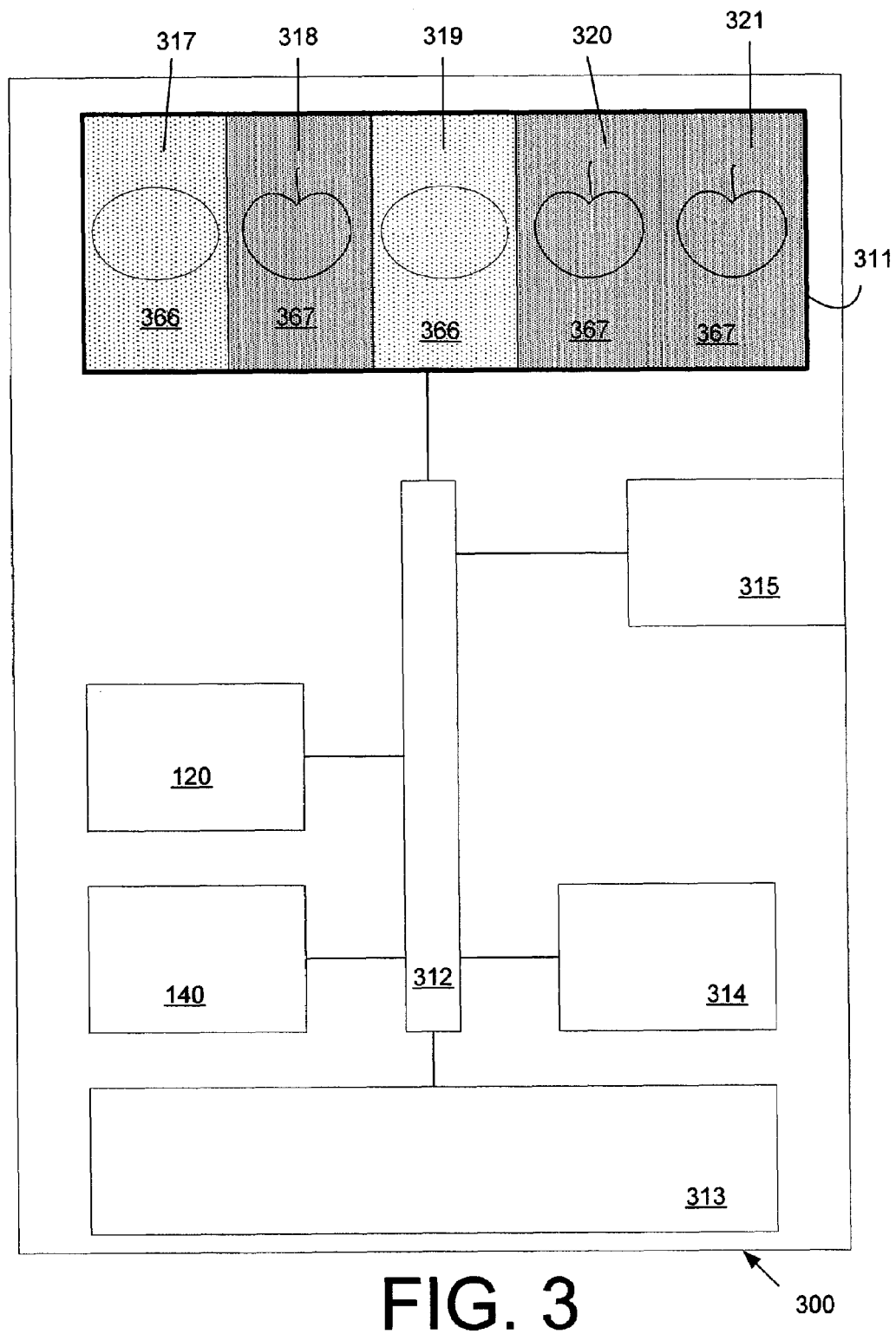
FIG. 3 is an exemplary circuit diagram for a device including an LCD system of FIGS. 1 and 2.

FIG. 3 shows one example of a device 300 that includes a display system 100. The device 300 may include a housing 301, an LCD 311, a processing device 120, a memory 130, a communications interface 312, a user interface 313, a speaker 314, and a power source 315. The housing 301 may include in one or more pieces that may be formed, shaped, or assembled into a device, such as a toy, a game piece, a game, a machine, or any other hand held, portable, or semi portable device, to hold and/or contain elements of the device 300.

The LCD 311 may be placed in or assembled with the housing 301 so as to be viewed by a user. As shown in FIG. 3, the LCD 311 includes five sectors 317, 318, 319, 320, and 321 and may be implemented with any LCD technologies, including those described above. Each sector has an associated backlighting element 130 (not shown) to backlight the associated sector with a particular color under control of the processing device 120. The backlit sector of the LCD 311 appears to illuminate or emit the particular color selected by the processing device 120. The LCD 311 is controlled by the processing device 120 as explained above in connection with the display system 100. The LCD 311 may present information to the user, such as operating information (e.g., status, on, off, and modes), programming information (e.g., selections, menus, lists, and options), and games, including images, shapes, animations, and characters.

A communications interface 312 may be provided to allow communication of data between various elements of the device 300. Although the interface 312 is shown as a single block within FIG. 3 it will be understood that this element may comprise several interfaces with distinct communications/data paths suited for the information and or data exchanged between the elements.

The device 300 also may include one or more user interfaces 313 allowing a user to interact with or program the device 300 using the processing device 120. The user interface 313 may include one or more input devices, such as, for example, keys, buttons, switches, knobs, and levers, in addition to keypads, keyboards, and touch screens. The user interface 313 may be used to power on/off or a separate on/off power switch may be provided. The device 300 also may include one or more speakers 314 to provide audible information to a user, such as sounds, sound effects, speech, recordings, music, or any other audible data.

The device 300 also may include one or more power sources 315 to provide power to one or more elements of the device 300. The power source 340 may be internal or external and replaceable (e.g., one or more batteries). In one implementation, the processing device 120 may provide a time out feature which places the device 300 in a standby, sleep, or off mode to conserve power.

In one example, the device 300 may implement a toy or game slot machine. The user interface 313 allows the player to select and play the game. Upon activation of the slots, the processing device 120 causes various shapes (e.g., lemons, cherries, oranges, bananas) to appear in each sector on each play. Various effects and animations (such as spinning) and flashing of colors also may be presented by the LCD 311. Based on the shapes shown different monetary values or points may be awarded. As shown in FIG. 3, sector 317 show a lemon, sector 318 shows a cherry, sector 319 show a lemon, sector 320 shows a cherry, and sector 321 shows a cherry. In addition to presenting a shape, the processing device controls each backlighting element 130 to emit a color associated with the shape, for example, yellow 366 for lemon and red 367 for cherry. When spinning a number of random or predetermined colors may be emitted by the backlighting elements for each sector.

Color plays a significant role in our daily lives. Colors may be used to convey information or may be used for aesthetic/ornamental applications among others. Children are taught about colors as part of learning and interacting with their surroundings. Therefore, toys often try to utilize color for educational, aesthetic, and entertainment purposes. However, cost is a significant factor in the manufacture of many toys. As a result, most toys and other small and/or inexpensive devices use monochrome LCDs as color LCDs are cost prohibitive.

As electronics become cheaper and more prevalent they are continually being asked to perform in better and more enhanced ways. As a result, the LCD system described herein my incorporated into devices while adding little overall cost to the manufacture of the items. However, the addition of color to these displays greatly enhances the user experience and attractiveness of the device.

A number of exemplary implementations have been described. Nevertheless, it will be understood that various modifications may be made. Suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A liquid crystal display (LCD) system configured to present color by a monochrome LCD, the system comprising:
   a monochrome LCD to display monochrome information including at least two sectors;
   at least two backlighting elements to emit light of a plurality of colors, each backlighting element associated with one sector of the LCD and configured to backlight the one associated sector with a color selected from among a plurality of predetermined colors; and
   a processing device configured to control display of the information on the LCD and configured to select the color emitted by each backlighting element from among the plurality of predetermined colors to backlight the associated sector with the selected color.

2. The system of claim 1 wherein each backlighting element includes two or more different color light emitting diodes (LEDs) wherein the intensity of each color LED is controlled by the processing device to provide the color selected by the processing device.

3. The system of claim 1 further comprising a reflective element positioned relative to the backlighting element to reflect the color light emitted by the backlighting element to the LCD to backlight the one associated sector.

4. The system of claim 1 further comprising a diffusing element between the backlighting element and the LCD to allow light passing through the diffusing element to be randomly scattered and backlight the one associated sector.

5. The system of claim 1, further comprising a storage device to store data associated with each predetermined color wherein the processing device is configured to read the storage device to access the data associated with the predetermined color to control each backlighting element to emit light of the corresponding selected color.

6. The system of claim 1 wherein the processing device is configured to make multiple selections from the plurality of predetermined colors to change the color of light emitted by each backlighting element in real time with the information displayed.

7. The system of claim 1 wherein the processing device is configured to select the color of light emitted by each backlighting element based on the information displayed.

8. A liquid crystal display (LCD) system configured to present color by a monochrome LCD, the system comprising:
   a first monochrome LCD to display monochrome information;
   a second monochrome LCD to display monochrome information;
   at least two backlighting elements to emit light of a plurality of colors, each backlighting element associated with one of the monochrome LCDs and configured to backlight the one associated one of the monochrome LCDs with a color selected from among a plurality of predetermined colors;
   a processing device configured to control display of the information on each monochrome LCD and configured to select the color emitted by each backlighting element from among the plurality of predetermined colors to backlight the associated one of the monochrome LCDs with the selected color; and
   a housing to secure the first and second monochrome LCDs in fixed relation to the backlighting elements.

9. The system of claim 8 wherein each backlighting element includes two or more different color light emitting diodes (LEDs) wherein the intensity of each color LED is controlled by the processing device to provide the color selected by the processing device.

10. The system of claim 8 further comprising one or more reflective elements positioned relative each backlighting element to reflect the color light emitted by the backlighting element to the associated LCD.

11. The system of claim 8 further comprising a diffusing element positioned between the backlighting element and the associated LCD to allow light passing through the diffusing element to be randomly scattered and backlight the associated LCD.

12. The system of claim 8, further comprising a storage device to store data associated with each predetermined color wherein the processing device is configured to read the storage device to access the data associated with the predetermined color to control each backlighting element to emit light of the corresponding selected color.

13. The system of claim 8 wherein the processing device is configured to make multiple selections from the plurality of predetermined colors to change the color of light emitted by each backlighting element in real time with the information displayed.

14. The system of claim 8 wherein the processing device is configured to select the color of light emitted by each backlighting element based on the information displayed.

15. The system of claim 8 wherein the information is associated with a game or a toy.

16. A portable device comprising:
   a monochrome LCD to display monochrome information including at least two sectors;
   at least two backlighting elements to emit light of a plurality of colors, each backlighting element associated with one sector of the LCD and configured to backlight the one associated sector with a color selected from among the plurality of predetermined colors;
   a processing device configured to control display of the information on the LCD and configured to select the color emitted by each backlighting element from among the plurality of predetermined colors to backlight the associated sector with the selected color; and
   a housing to secure the monochrome LCD in fixed relation to the backlighting elements.

17. The device of claim 16 wherein each backlighting element includes two or more different color light emitting diodes (LEDs) wherein the intensity of each color LED is controlled by the processing device to provide the color selected by the processing device.

18. The device of claim 16 further comprising a reflective element positioned relative to the backlighting element to reflect the color light emitted by the backlighting element to the LCD to backlight the one associated sector.

19. The device of claim 16 further comprising a diffusing element between the backlighting element and the LCD to allow light passing through the diffusing element to be randomly scattered and backlight the one associated sector.

20. The device of claim 16, further comprising a storage device to store data associated with each predetermined color wherein the processing device is configured to read the storage device to access the data associated with the predetermined color to control for each backlighting element to emit light of the corresponding selected color.

21. The device of claim 16 wherein the processor device is configured to make multiple selections from the plurality of predetermined colors to change the color of light emitted by each backlighting element in real time with the information displayed.

22. The device of claim 16 wherein the processing device is configured to select the color of light emitted by each backlighting element based on the information displayed.

23. The device of claim 16 further comprising a user interface to control and interact with the processing device.

24. The device of claim 16 wherein the information displayed is associated with a game or a toy.

* * * * *